(12) United States Patent
Genc et al.

(10) Patent No.: US 9,189,503 B2
(45) Date of Patent: Nov. 17, 2015

(54) DATABASE SCALE-OUT

(71) Applicant: Microsoft Corporation, Redmond, WA (US)

(72) Inventors: Goksel Genc, Redmond, WA (US); Humberto Lezama Guadarrama, Redmond, WA (US); Gary Chang, Redmond, WA (US); Andrew Sean Watson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 13/707,037

(22) Filed: Dec. 6, 2012

(65) Prior Publication Data

US 2014/0164443 A1    Jun. 12, 2014

(51) Int. Cl.
*G06F 17/30* (2006.01)

(52) U.S. Cl.
CPC .............. *G06F 17/303* (2013.01); *G06F 17/30* (2013.01); *G06F 17/30584* (2013.01)

(58) Field of Classification Search
CPC ................... G06F 17/30575; G06F 17/30286; G06F 17/30067; G06F 17/30008; G06F 17/30017; G06F 17/30011; G06F 17/30212; G06F 17/303; G06F 17/30584; G06F 17/30; G06F 17/30339; G06F 17/30566; G06F 3/0484; H04L 29/0854; Y10S 707/964; Y10S 707/971
USPC .......... 707/707, 610, 620, 638, 634, E17.005, 707/E17.032, 809, 613, 611, 827, 687, 633, 707/649, 812, 636, 964, 971, 637, 674, 803, 707/790, E17.007, E17.055, 617, 714, 718, 707/E17.054, E17.017; 709/201, 223, 206, 709/208, 217; 714/54, 100; 719/328

See application file for complete search history.

(56) References Cited

U.S. PATENT DOCUMENTS

| | | | | |
|---|---|---|---|---|
| 6,748,393 B1 * | 6/2004 | Kapoor et al. | ........ | 707/E17.032 |
| 6,789,071 B1 * | 9/2004 | Kapoor et al. | ........ | 707/E17.032 |
| 7,058,958 B1 * | 6/2006 | Shutt et al. | .................... | 711/100 |
| 7,280,996 B2 * | 10/2007 | Hayakawa et al. | ........... | 707/621 |
| 7,308,666 B1 * | 12/2007 | Li | ................................ | 716/113 |
| 7,557,941 B2 * | 7/2009 | Walmsley | .................... | 358/1.14 |
| 7,577,640 B1 * | 8/2009 | Bland et al. | ................... | 711/114 |
| 7,848,942 B2 * | 12/2010 | Sadiq | ........................... | 705/7.11 |
| 7,958,088 B2 | 6/2011 | Yerneni et al. | | |
| 8,073,870 B2 * | 12/2011 | Waring et al. | ................. | 707/785 |
| 8,266,101 B1 * | 9/2012 | Shuai | ............................. | 707/610 |
| 8,285,677 B2 * | 10/2012 | Bostick et al. | ................ | 707/638 |

(Continued)

OTHER PUBLICATIONS

Alexander Thomson et al.—"Calvin: fast distributed transactions for partitioned database systems"—Proceeding SIGMOD'12 Proceedings of the 2012 ACM SIGMOD International Conference on Management of Data; SIGMOD'12 May 20-24, 2012—pp. 1-12.*

(Continued)

*Primary Examiner* — Anh Ly
(74) *Attorney, Agent, or Firm* — Danielle Johnston-Holmes; Tom Wong; Micky Minhas

(57) ABSTRACT

A method for scaling out database information may include creating second database instantiation. The method may include configuring one or more partitions of a first database for transfer to the second database and configuring the second database for receiving the one or more first database partitions. The method may also include transferring the one or more first database partitions to the second database.

20 Claims, 9 Drawing Sheets

(56) References Cited

U.S. PATENT DOCUMENTS

| | | | |
|---|---|---|---|
| 2004/0024795 A1* | 2/2004 | Hind et al. | 707/204 |
| 2004/0181625 A1* | 9/2004 | Armstrong et al. | 710/200 |
| 2006/0206507 A1* | 9/2006 | Dahbour | 707/100 |
| 2007/0050420 A1 | 3/2007 | Sankruthi | |
| 2007/0083574 A1 | 4/2007 | Garin, Jr. et al. | |
| 2007/0206839 A1* | 9/2007 | Hanna et al. | 382/115 |
| 2008/0126146 A1 | 5/2008 | Benveniste et al. | |
| 2008/0133543 A1 | 6/2008 | Fu et al. | |
| 2008/0189715 A1* | 8/2008 | Armstrong et al. | 718/104 |
| 2008/0256204 A1* | 10/2008 | Kamat et al. | 709/206 |
| 2009/0043800 A1* | 2/2009 | Fox et al. | 707/102 |
| 2010/0131506 A1* | 5/2010 | Shintani et al. | 707/737 |
| 2010/0235606 A1* | 9/2010 | Oreland et al. | 711/173 |
| 2010/0241672 A1 | 9/2010 | Bryant et al. | |
| 2010/0293140 A1* | 11/2010 | Nishiyama | 707/636 |
| 2011/0099146 A1* | 4/2011 | McAlister et al. | 707/634 |
| 2011/0225122 A1* | 9/2011 | Denuit et al. | 707/634 |
| 2011/0238620 A1 | 9/2011 | Ramineni et al. | |
| 2012/0079484 A1* | 3/2012 | Shoolman et al. | 718/100 |
| 2012/0254715 A1* | 10/2012 | Schwartz et al. | 715/230 |
| 2013/0086021 A1* | 4/2013 | Iizuka et al. | 707/705 |
| 2013/0110859 A1* | 5/2013 | Hanna et al. | 707/758 |
| 2013/0132349 A1* | 5/2013 | Hahn et al. | 707/649 |
| 2013/0198209 A1* | 8/2013 | Mortazavi | 707/754 |
| 2013/0226971 A1* | 8/2013 | Shoolman et al. | 707/790 |
| 2013/0232177 A1* | 9/2013 | Shoolman et al. | 707/803 |
| 2013/0290249 A1* | 10/2013 | Merriman et al. | 707/610 |
| 2013/0311426 A1* | 11/2013 | Erdogan et al. | 707/610 |
| 2013/0311441 A1* | 11/2013 | Erdogan et al. | 707/713 |
| 2013/0311488 A1* | 11/2013 | Erdogan et al. | 707/752 |
| 2014/0244581 A1* | 8/2014 | Rath | 707/623 |

OTHER PUBLICATIONS

Karyakin, Alexey—"Dynamic Scale-out Mechanisms for Partitioned Shared-Nothing Databases"—Date: Sep. 30, 2011 (submitted on: 2011), Waterloo, Ontario, Canada—uwspace.uwaterloo.ca pp. 1-71.*

Glossary for IBM InfoSphere IMS Replication for z/OS, Jan. 10, 2012, obtained online at http://publib.boulder.ibm.com/infocenter/dzichelp/v2r2/index.jsp?topic=%2Fcom.ibm.swg.im.iis.clz.imsr.overview.doc%2Ftopics%2Fiiycommglossary.html, May 3, 2012, 7 pages.

How to transfer sql encrypted data between SQL Server 2005 databases?, Sep. 30, 2008, obtained online at: http://stackoverflow.com/questions/149876/how-to-transfer-sql-encrypted-data-between-sql-server-2005-databases, Apr. 23, 2012, 2 pages.

PCT International Search Report and Written Opinion in International Application PCT/US2013/072686, mailed Aug. 20, 2014, 10 pgs.

Baru, C.K. et al., "DB2 Parallel Edition", IBM Systems Journal, IBM Corp., Armonk, NY, USA, vol. 34, No. 2, Mar. 21, 1995, pp. 292-322, 31 pages altogether.

"MongoDB Documentation—Sharding", Oct. 14, 2012, retrieved from internet: http://wayback.archive.org/web/20121014171613/http://docs.mongodb.org/master/MongoDB-Manual-master.pdf, retrieved Aug. 8, 2014, 52 pages.

Anonymous: Scalability—Wikipedia, the free encyclopedia, Oct. 15, 2012, retrieved from the internet: http://en.wikipedia.org/w/index.php?title=Scalability&oldid=517862083, retrieved Aug. 8, 2014, 6 pages.

Mehta, M. et al., "Data placement in shared-nothing parallel database systems", VLDB Journal, Springer Verlag, Berlin, DE, Feb. 1, 1997, retrieved from the internet: http://delivery.acm.org/10.1145/770000/765547/70060053.pdf?key1=765547&key2=1140469421&coll=GUIDE&dl=GUIDE&CFID=47924469&CFTOKEN=75342509, retrieved on Aug. 7, 2009, pp. 53-72.

"Written Opinion Issued in PCT Patent Application No. PCT/US2013/072686", Mailed Date: Jan. 16, 2015, 7 Pages.

European Communication in Application 13811071.3, mailed Jul. 14, 2015, 2 pgs.

* cited by examiner

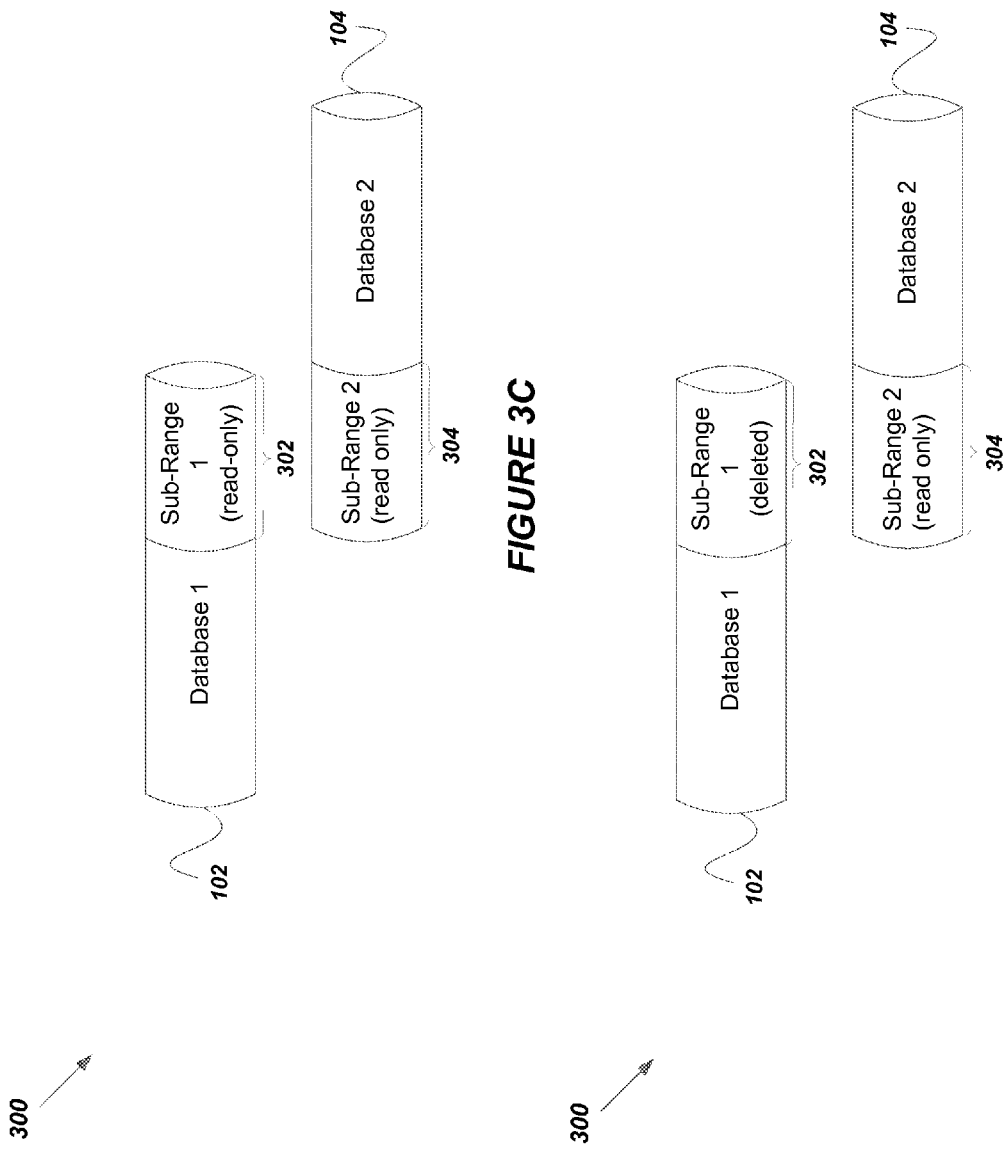

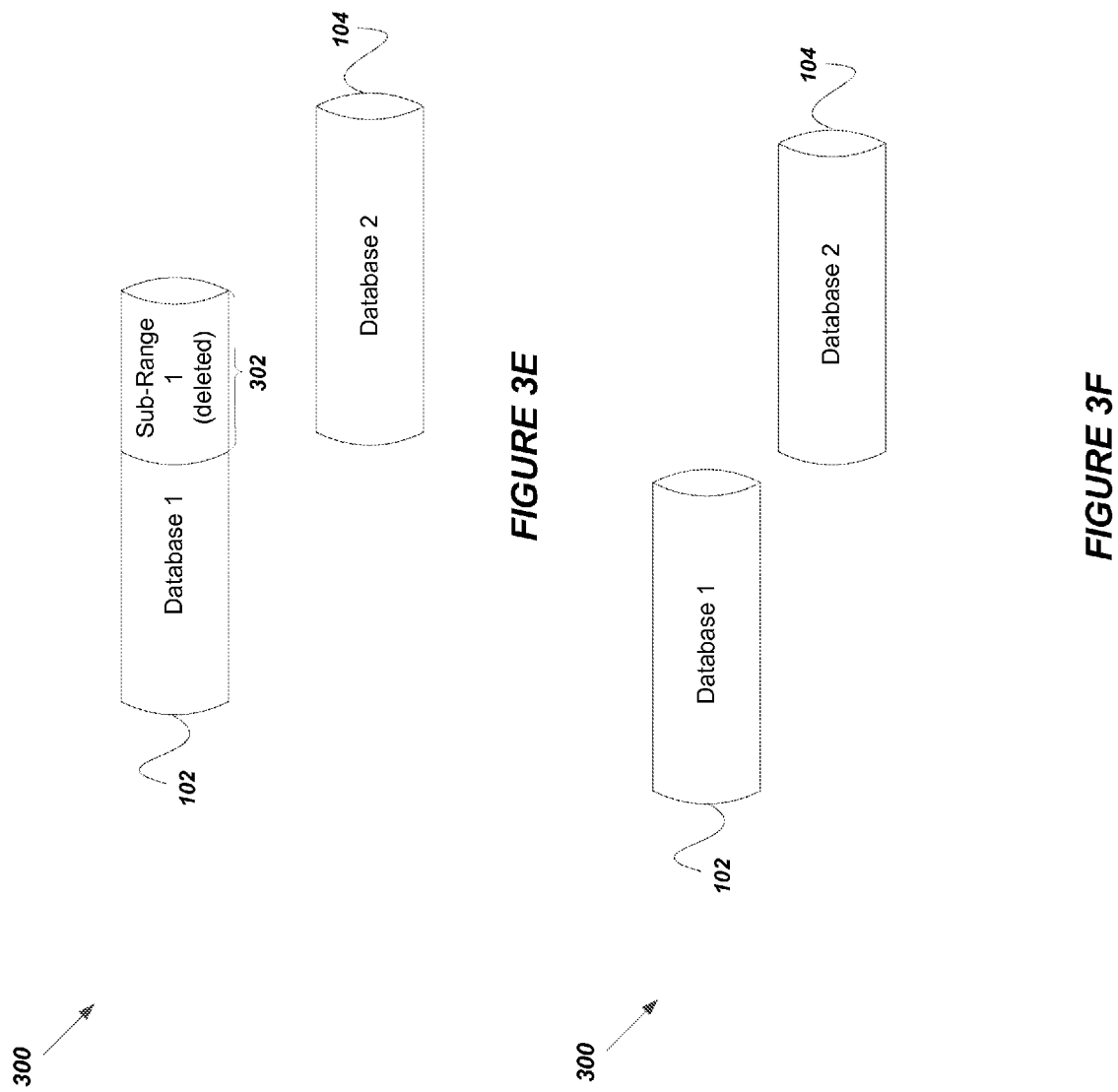

DATABASE SCALE-OUT

BACKGROUND

Databases are software systems that support the storage of data as collections of logical constructs called tables, each of the tables containing records with a specified structure. As the number of applications grows in a single database, the load on that database may become be too high for the database to provide reasonable response times. One approach to solving this problem is adding more storage in the database for the additional data. However, this solution may increase data delivery time, providing a less desirable end user experience. Further, in some instances, scaling out of a database may be necessary because scaling up (e.g. adding additional disk space, RAM, CPU, etc.) has practical and physical limitations (e.g. a single database server may only support a certain amount of RAM).

SUMMARY

This summary is provided to introduce a selection of concepts in a simplified form that are further described below in the Detailed Description section. This summary is not intended to identify key features or essential features of the disclosure subject matter, nor is it intended to be used as an aid in determining the scope of the disclosure.

Embodiments are provided to enable database scale-out. A database reaching capacity may be scaled-out in real time to provide additional databases and decrease the load on a single database. To this end, methods and systems providing scale-out of database content are disclosed. A first database may be at or near capacity and a server component may be triggered to initiate a data move. The server component may then execute a process for creating or extending a second database and transferring a portion of first database data to the second database.

An embodiment includes a method for providing scale-out of database content. The method may generally include creating an instantiation of a second database, the second database instantiation based in part on a first database reaching capacity; configuring one or more partitions of the first database for transfer to the second database; configuring the second database to receive the one or more first database partitions; and transferring the one or more first database partitions to the second database.

A computer-readable medium comprising executable instructions that, when executed by a processor, provide scale-out of database content is also disclosed. The computer-readable medium includes instructions executable by the processor for: creating an instantiation of a second database, the second database instantiation based in part on a first database reaching capacity; configuring one or more partitions of the first database for transfer to the second database; configuring the second database for receiving the one or more first database partitions; and transferring the one or more first database partitions to the second database.

A computer-readable medium comprising executable instructions that, when executed by a processor, provide scale-out of database content is also disclosed. The computer-readable medium includes instructions executable by the processor for: receiving an alert message from a first database, the alert message indicating that the first database is reaching capacity; creating a first data sub-range for the first database, the first data sub-range having a read only mode; extending a range of a second database to at least the range of the first data sub-range; creating a second data sub-range on the second database, the second data sub-range having a changing mode, the second data sub-range created at a database location adjacent to the first data sub-range; transferring data associated with key values representing a start point and an end point of the first data sub-range to the second database; changing the mode of the second data sub-range to read-only; changing the mode of the first data sub-range to deleted; removing the second data sub-range on the second database, which changes the data mode of contained data to read-write; clearing the first data sub-range on the source database, which causes the source database data range to contract to exclude the first data sub-range; and deleting the data in the first database associated with the key values.

BRIEF DESCRIPTION OF THE DRAWINGS

Referring now to the drawings in which like reference numbers represent corresponding parts throughout:

FIGS. 3A-3F further illustrate a routine for providing database scale-out according to an embodiment of the disclosure;

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Embodiments are provided to enable real time database scale-out for databases reaching capacity. Methods and systems providing database scale-out are disclosed. In the embodiments described herein, the database scale-out systems and methods provide improved response time in the fast access scenarios to data in systems with rapidly growing data size and user base. The methods and systems provide flexible scaling out, where any database may be dynamically divided, which provides increased reaction time to changing user behavior.

The database scale-out system provides the necessary mechanisms for any database to implement data transfer operations between databases. Embodiments herein also provide a set of rules for runtime operations, which may enable runtime operations running in parallel with data transfer operations between databases. Embodiments herein further provide a data transfer history of data states which may be utilized to select a data recovery application in instances where a database is recovered from a back-up executed during the data transfer.

Figure 1:
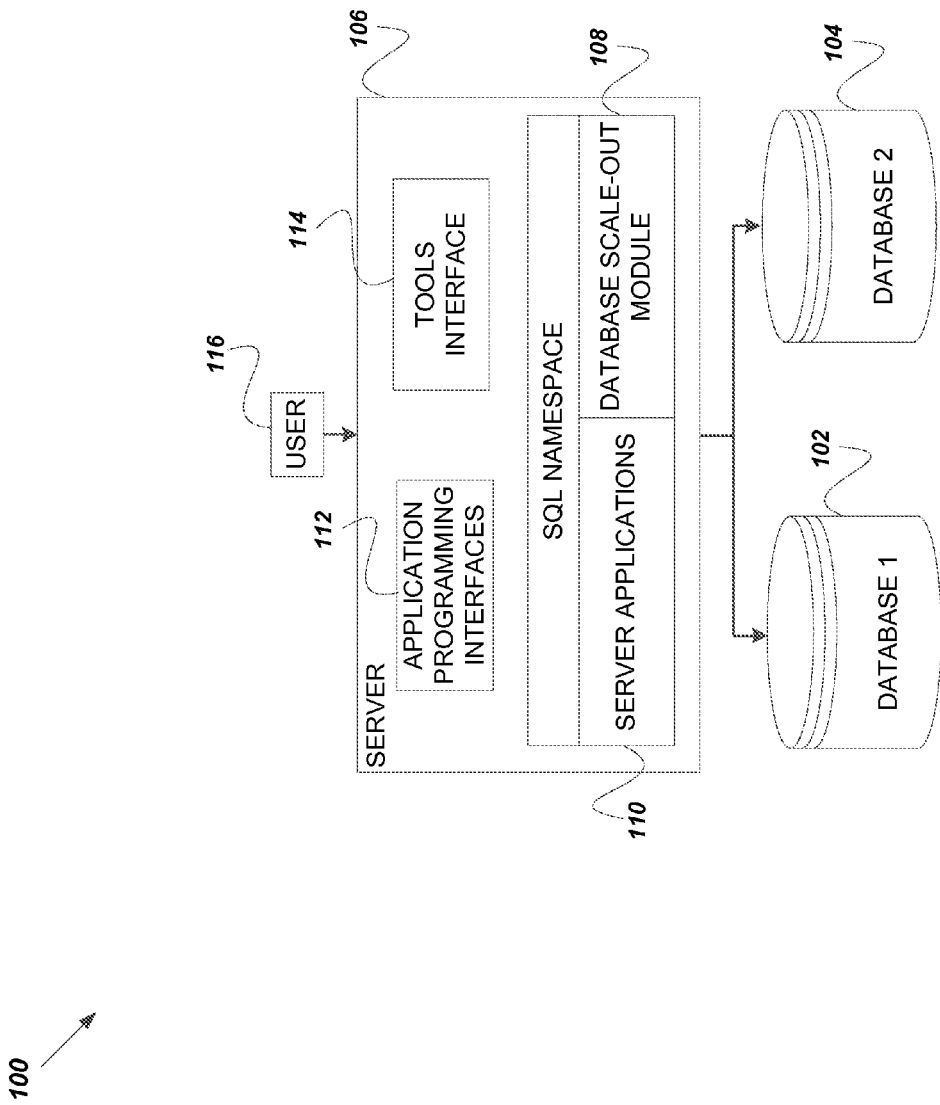
FIG. 1 illustrates the high level architecture of a system for providing database scale-out according to an embodiment of the disclosure.

Referring now to the drawings, in which like numerals represent like elements, various illustrative embodiments will now be described. FIG. 1 illustrates the high level architecture of a system 100 for providing database scale-out according to one embodiment. The system shown in FIG. 1 is for illustration purposes only. The computer system 100 and its components include functionality to communicate with other computing devices, communication devices, and/or other systems and are not intended to be limited to the embodiments and examples described herein.

As shown in FIG. 1, the computer system 100 includes, without limitation, a first databases 102 and second database 104 in communication with a server 106. First and second databases 102, 104 may hereinafter also be referred to as source and destination databases, respectively. Generally, the databases 102, 104 may be configured to store a collection of related data, such as the financial transactions of a business. In exemplary embodiments, the first and second databases 102, 104 may be configured to be operable with SharePoint® services technology to provide access to data stored in the databases 102, 104 for use in workflows, documents, etc. The databases 102, 104 include associative structures. Associative structures are transparent to the users of the database but are necessary for efficient operation and control of the database management system. An example of an associated structure is an index, typically, but not necessarily, in the form of a B-tree or a hash index.

The first and second databases 102, 104 may preferably be relational databases in which data is organized in multiple tables having a two-dimensional column and row form. For instance, a relational database may particularly include a relational database management system (RDBMS), which may be a control system that supports database features including, but not limited to, storing data on a memory medium, retrieving data from the memory medium and updating data on the memory medium. Generally, data stored in a relational database is accessed by way of a user-defined query that is constructed in a query language such as SQL. Typically, for any given SQL query there are numerous procedural operations that need to be performed on the data in order to carry out the objectives of the SQL query. For example, there may be numerous joins and table scans that need to be performed so as to accomplish the desired objective. While the embodiments above describe a system including databases utilizing SQL database-services technology, it should be understood that the embodiments described herein should not be construed as being limited to SQL database-services technology and that other database services technology from other developers and/or manufacturers may also be utilized.

The server 106 of FIG. 1 may include a simplified SQL server RDBMS architecture. As described more fully below, the server 106 may include a database scale-out module 108. In accordance with various embodiments, the server 106 may also include various program modules and application programs including, without limitation, server applications 110, Application Programming Interfaces (APIs) 112, a tools interface 114, and the like. In some embodiments, a database scale-out procedure may be initiated by a user 116, however, in preferred embodiments, the scale-out procedure may initiate automatically, for instance, upon a database reaching capacity.

The database scale-out module 108 may provide the ability to transfer data between homogenous data sources. Specifically, the database scale-out module 108 may provide a data transfer mechanism for transferring data between two databases with the same schema. This mechanism can be used to move scale-out partitions of databases between multiple instances of the same implementation of a database server. To this end, the system 100 may provide communication between the database scale-out module 108 (which may be a database management middle tier component of the server 106) and the databases 102, 104. Communications between the database scale-out module 108 and the databases 102, 104 may include the requests that manage a data range and scale-out partitions for a given scale-out, for which the server 106 is responsible. The database scale-out module 108 may be further configured to provide one or more the communication sequences used to perform data query and update operations on the server in relation to data ranges and partitions. The database scale-out module 108 relies on the fact that each database (or database instance) is configured to maintain a notion of data range and provide the necessary stored procedures to create and modify the database. The database scale-out module 108 may also send requests to read or write data into scale-out partitions on the server using any known transport protocol to call stored procedures and to return return codes and result sets.

In one specific example, a developer may notice that database deployment has slowed down considerably in one of his databases. When looking at the load of an SQL server, the developer may notice that the database storing a certain type of document (e.g., licenses) is at or near capacity. The developer may have another server running SQL, and may want to offload a portion of the data stored in the first database to another database. The system 100 may enable the developer to initiate a data transfer to the second database. Upon transfer of at least a portion of the first database data, response times may decrease due to the decreased load on the database. The system 100 may alternatively provide dynamic data transfer deployment to ensure that data may be transferred from one database to another without user intervention if a need for a database scale-out arises again.

It should be appreciated that the aforementioned program modules and application programs may be utilized to provide database scale-out. It should be appreciated, however, that database and application programs from other manufacturers may also be utilized to embody the various aspects of the technical features discussed herein.

Figure 2:
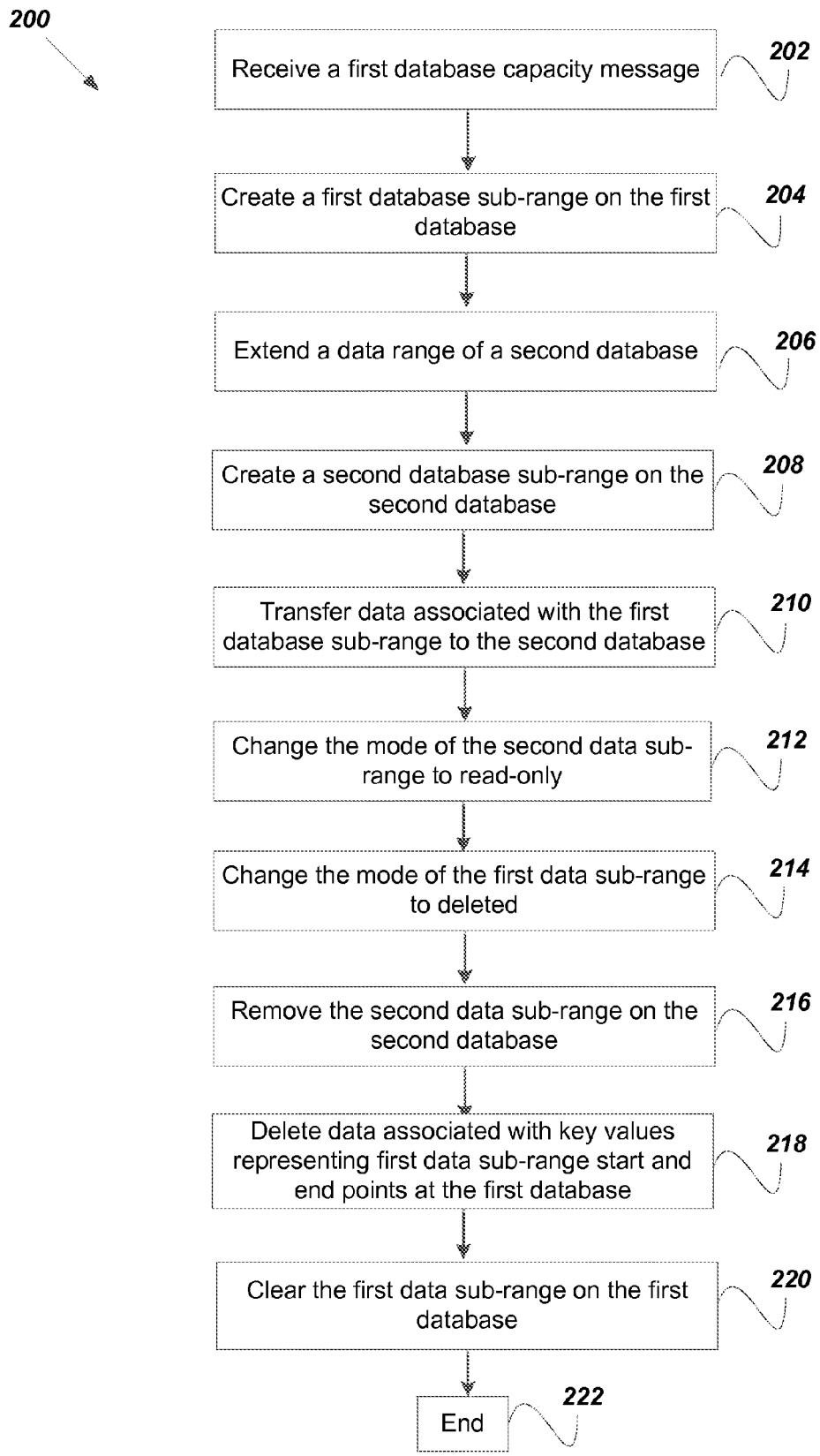
FIG. 2 is a flow diagram illustrating a routine for providing database scale-out according to an embodiment of the disclosure.

Turning now to FIG. 2, a flow diagram illustrating a routine 200 for providing database scale-out at run-time, in accordance with various embodiments, will now be described. In some embodiments, the routine 200 may be implemented via the system components and/or applications described above with respect to FIG. 1. Further examples of the systems and methods described herein are also provided in FIGS. 3A-7. FIGS. 3A-3F further illustrate a routine 300 for providing database scale-out according to an embodiment of the disclosure. Additional or alternative embodiments using components other than those described herein are also contemplated.

The routine 200 begins at operation 202, where a message regarding a first database capacity is received. For instance, the database scale-out module 108 may receiving a message from the first database 102, indicating that the first database 102 is reaching capacity. Receiving a database capacity message may include receiving a request to move a pre-determined amount of data to another database. For example, a user may request to move one or more scale-out partitions of the first database 102. A scale-out partition may be collection of data about a logical entity. The move request may include a request to move one or more first database scale-out partitions having a total weight equal to some percentage (e.g. 50%) of the total weight of all the first database scale-out partitions. Alternatively, a scale-out may be triggered automatically, and the amount of data to be moved may be predetermined by the system 100. Upon receiving the database capacity message and move request, the database scale-out module 108 may then initiate a data transfer procedure.

Figure 3A:
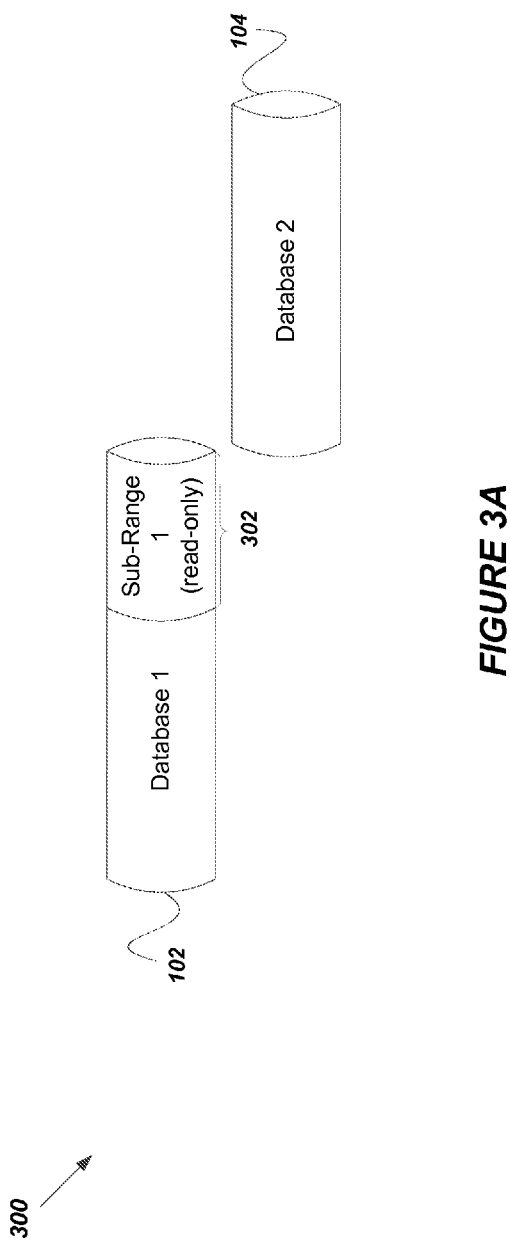

From operation 202, the routine 200 continues to operation 204, where a first database sub-range is created. A data sub-range may be subset of consecutive scale-out partition keys inside a data range. A data range may be a range of binary key values associated with a start and an end point. As will be described in greater detail below, the database scale-out module 108 may be configured to provide a data transfer operation between a source database and a destination database having adjacent data ranges. Specifically, to effect a data transfer, a first data range end point may be the same as a second data range start point. As illustrated in FIG. 3A, a first data sub-range 302 may be created at an end point of the first database 102. An initial range end point may be designated, and may represent the end point of the original data range. A data-sub range either starts with the same scale-out partition key or ends with the same scale-out partition key as the data range it belongs to does. A scale-out partition key size may be specified. A scale-out partition key may be a binary value that uniquely identifies a logical entity. An upper data sub-range may be a data sub-range that ends with the same scale-out partition key as the data range it belongs to. Only one upper data sub-range may exist inside a data range. The upper data sub-range may include an upper data sub-range end point. A lower data sub-range may be a data sub-range that starts with the same scale-out partition key as the data range it belongs to. Only one lower data sub-range may exist inside a data range. The lower data sub-range may include a lower data sub-range end point.

With respect to initiating sub-range creation, a procedure may be called to create a first data sub-range in the first database with specified start and end points. For instance, the database scale-out module 108 may send a request to create a data sub-range at the first database. A data transfer may occur in chunks, hereinafter also referred to as data sub-ranges. A data move chunk may be a unit of data, moved during a move operation that contains a set of scale-out partitions designated at the beginning of the scale-out procedure. A chunk size may be the limit for the sum of weight attributes of the scale-out partitions in a data move chunk. The weight to move may be the limit for the sum of weight attributes of all the scale-out partitions that have scale-out partition keys falling into any of the data move chunks that are represented by the data move chunk limit points to be returned. As with a data range, a data sub-range may be a range of binary key values associated with a start and an end point. Specifically, key values may be associated with the first data sub-range start and end points to assist with transferring the data chunks. Key values may determine the way that the server 106 responds to queries made to the scale-out partitions. A database may include a single data sub-range either at the beginning or at the end of its data range. A data sub-range may be assigned a mode dictating the runtime behavior of the data residing in that data sub-range. Data sub-range mode may be the runtime state of the data sub-range, which determines the data access conditions for all of the scale-out partitions that have scale-out partition keys falling inside the data sub-range. For instance, when a first database sub-range is created, the data sub-range may be designated as read-only. The first data sub-range may also be assigned a random identifier.

The database scale-out module 108 may be configured to call the first database 102 to determine the total count and the total weight of the first database partitions available for scaling out. In preferred embodiments, the total count may be the total number of partitions available for scaling out, and the total weight may be the sum of the weight attributes of all the scale-out partitions that are stored on the first database. The first database may provide a response message to the database scale-out module 108 including the total count and weight of all first database partitions. Upon receiving the response message, the database scale-out module 108 may then calculate a percentage or other sub-portion of the partitions. For instance, continuing the example above, the database scale-out module 108 may calculate 50% of the total weight and obtain the weight to move. The database scale-out module 108 may then create a data move plan for the calculated weight and receive one or more scale-out partition keys from the first database to execute the data move. Upon receiving the scale-out partition keys from the first database, the database scale-out module 108 may call a procedure to create a first data sub-range bounded by the scale-out partition key and the start or end point of the current data range of the first database. The first database may create a first data sub-range with the specified values. The database scale-out module 108 may then pass in the first data sub-range mode as read-only to this call.

Figure 3B:
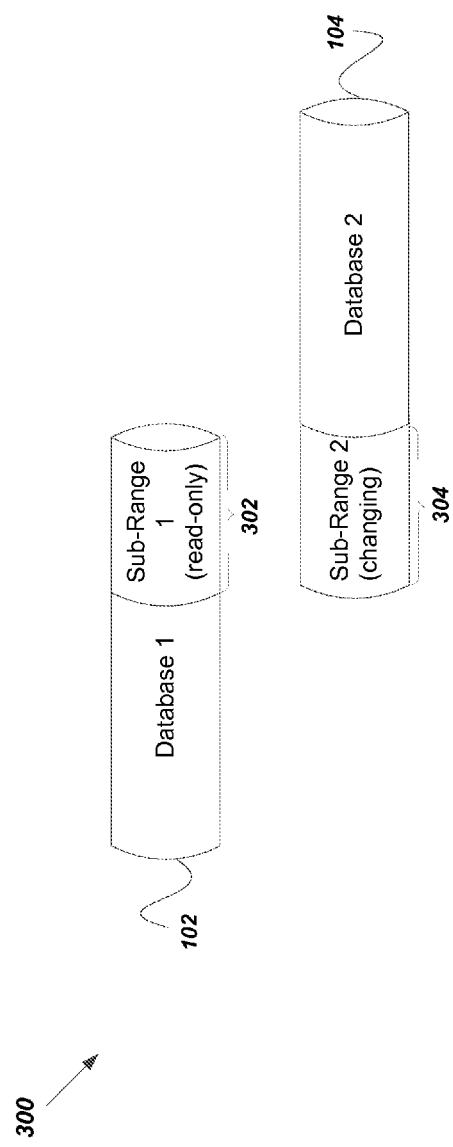

From operation 204, the routine 200 continues to operation 206, where the range of a second database may be extended. To this end, the database scale-out module 108 may be further configured to expand the data range on for instance, database 104. FIG. 3B illustrates a extending a second database range to include a second sub-range 304. In preferred embodiments, the range of a second (destination) database may be extended to at least the range of the first data sub-range on the first database 102. For instance, a procedure may be called to extend the data range of the second database 104 up to a designated scale-out partition key received from the first database 102. The database scale-out module 108 may then extend the data range accordingly.

From operation 206, the routine 200 continues to operation 208, where a second data sub-range is created on the second database. For instance the database scale-out module 108 may create a second data sub-range covering the extension of the second database. The second data sub-range may be created at a database location adjacent to the first data sub-range. The second database data range may be extended at either a start point or an end point. If the data range is extended by modifying the second database start point, a second database data sub-range will have the extended second database data range start point its start point and the original second database data range start point as its end point. If the data range is extended by modifying its end point, the second data sub-range will have the extended end point of the second database data range as its end point and the original end point of the second data range as its start point. FIG. 3B illustrates a second data sub-range 304 created at a start point of the second database 104. In such instances, the database scale-out module 108 may request the second data sub-range be created at a second database point adjacent to the first database end point. Extending the second database range may also initiate the creation of a new scale-out log entry including any the extension properties and any other specified log details. A scale-out log entry may be information that is recorded about a scale-out operation after the operation completes.

To create a second data sub-range, the database scale-out module 108 may receive a message from the first database that includes information regarding the first data sub-range. For instance, database scale-out module 108 may receive a list of result sets containing data for the scale-out partitions in the first data sub-range. The database scale-out module 108 may call a procedure to create a second data sub-range bounded by the scale-out partition key and the start or end point of the current data range of the second database. For instance, a mark data sub-range procedure may be called to create a new data sub-range or modify an existing one on the second database 104. If a lower data sub-range is targeted and one already exists, the second data sub-range mode and end point of the lower data sub-range may be updated. Otherwise, a lower data sub-range may be created with the specified data sub-range mode and end point. If an upper data sub-range is targeted and one already exists, the data sub-range mode and start point of the upper data sub-range may be updated; otherwise, an upper data sub-range may be created with the specified data sub-range mode and start point. The second database may then create a second data sub-range with the specified values. The second data sub-range may be designated as in changing mode, as illustrated in FIG. 3B with respect to second data sub-range 304. To this end, the database scale-out module 108 may also pass in the second data sub-range mode as changing to this call. Creating a second data sub-range may also initiate the creation of a scale-out log entry with any specified scale-out action attributes and any specified log details.

From operation 208, the routine 200 continues to operation 210, where the data associated with the first database sub-range is transferred to the second database. In some embodiments, to effect the data move, a query routing logic may dispatch a query at runtime to a designated destination database according to the key value included in query and the last known data ranges of all the databases. Using the established data move plan, the database scale-out module 108 may obtain a set of data move chunk start or end points in either descending or ascending order, respectively. The end point of the first data move chunk may be the end point of the first data range, and the end point of each data move chunk, except for the first, may be the same as the start point of the previous data move chunk. If end points are returned, the start point of the first data move chunk may be the start point of the first data range, and the start point of each data move chunk, except for the first, may be the same as the end point of the previous data move chunk. In some embodiments, start points may be returned in descending order, and end points may be returned in ascending order.

To effect the data move, the database scale-out module 108 may populate transferred data into returned partition data insert table types with the data coming from the result set, which may be at the same index as the partition data insert table type, and call each corresponding partition data insert stored procedure with the populated partition data insert table type on the second database. The second database may then receive instructions to insert all the data passed into the partition data insert stored procedures into the second data sub-range.

From operation 210, the routine 200 continues to operation 212, where the mode of the second data sub-range is changed to read-only. A runtime data transfer query may initiate a shared lock on the data range object in the database which may not be released until the end of a data move, thus ensuring that runtime queries get serialized with the data transfer operations. A runtime query may also verify whether the queried data key is within the first database data range and also whether the data key is in a data sub-range having a mode compatible with the query. For instance, the database scale-out module 108 may call a mark data sub-range procedure on the second database to set the data sub-range mode of the extension data sub-range to read only. The second database may then set the data sub-range mode on the specified data sub-range to read only, as illustrated in FIGS. 3C-3D with respect to second data sub-range 304.

From operation 212, the routine 200 continues to operation 214, where the mode of the first data sub-range is changed to deleted. For instance, once the data from the first data sub-range has been transferred to the second data sub-range, the database scale-out module 108 may call a mark data sub-range procedure on the first database to set the data sub-range mode of the first data sub-range to deleted. The first database may then set the first data sub-range mode on the specified data sub-range to deleted, as illustrated in FIG. 3D with respect to the first data sub-range 302.

From operation 214, the routine 200 continues to operation 216, where the second data sub-range on the second database is removed. FIG. 3E illustrates that the second data sub-range has been removed. Removing the second sub-range may then change the data mode of contained data to read-write. For instance, the database scale-out module 108 may call a mark data sub-range procedure on the second database 104 to set the data sub-range mode of the extended data sub-range to read/write. The second database may then set the data sub-range mode on the specified data sub-range to read/write.

From operation 216, the routine 200 continues to operation 218, where, the data associated with the key values representing a start point and an end point of the first data sub-range start and end points is deleted. The call may then initiate the deletion of the first data sub-range created for the first database. The first database may delete the first data sub-range along with all the data associated with the scale-out partitions inside the first data sub-range. For instance, a clear deleted sub-range stored procedure may be called to remove both a first data sub-range for which the first data sub-range mode is deleted and all the scale-out partitions that have scale-out partition keys inside the first data sub-range. The stored procedure may also create a scale-out log entry including any specified scale-out action attributes and/or specified log details. A value may be specified to indicate whether the first data sub-range to be removed is a lower data sub-range or an upper data sub-range. The start or end point of the first data sub-range to be removed may be designated as an initial deleted sub-range point. If the first data sub-range is a lower data sub-range, the value may represent the end point; otherwise, the value represents the start point. The value also may represent the sub-range point attribute of the scale-out log entry to be created. The initial data range start point may be designated, and may represent the starting point of the first (original) data range. If the first data sub-range to be removed is the lower data sub-range, the value may also represent the range limit point attribute of the scale-out log entry to be created.

From operation 218, the routine 200 continues to operation 220, where the first data sub-range on the first database is cleared. The database scale-out module 108 may call a procedure to clear the excluded sub-range on the first database. The clearing of the first data sub-range may cause the first database data range to contract to exclude the first data sub-range.

From operation 220, the routine 200 may then terminate at operation 222. Alternatively, the above routine may repeat until the desired percentage of data is transferred to a destination database instance. In some embodiments the database scale-out module 108 may notify a user that the data move operation is finished. FIG. 3F illustrates termination of a data move, wherein neither database 102, 104 includes a data-move initiated data sub-range.

The routine 200 may be subject to one or more runtime rules. Specifically, at run-time, one or more runtime rules may be applied to any or all of the operations discussed herein. For instance, with reference to the components of FIG. 1, the database scale-out module 108 may provide one or more runtime rules for executing a data transfer. A first runtime rule may be that a query may not write data for keys within a data sub-range in read-only mode. A second runtime rule may be that a query may not read or write data for keys within a data sub-range in either changing or deleted mode.

A data transfer history may also be provided upon termination of any or all data transfers. For instance, the operations performed during a data transfer may be logged into each database with all the information about the data sub-ranges. In case of a catastrophic failure any database back-up will contain the necessary information which will have all the history of the operations that involved that particular database instance. This knowledge can be used to identify if another back-up from an older snapshot of the database is needed or to create a data-ranges state for an array of database instances.

Figure 4:
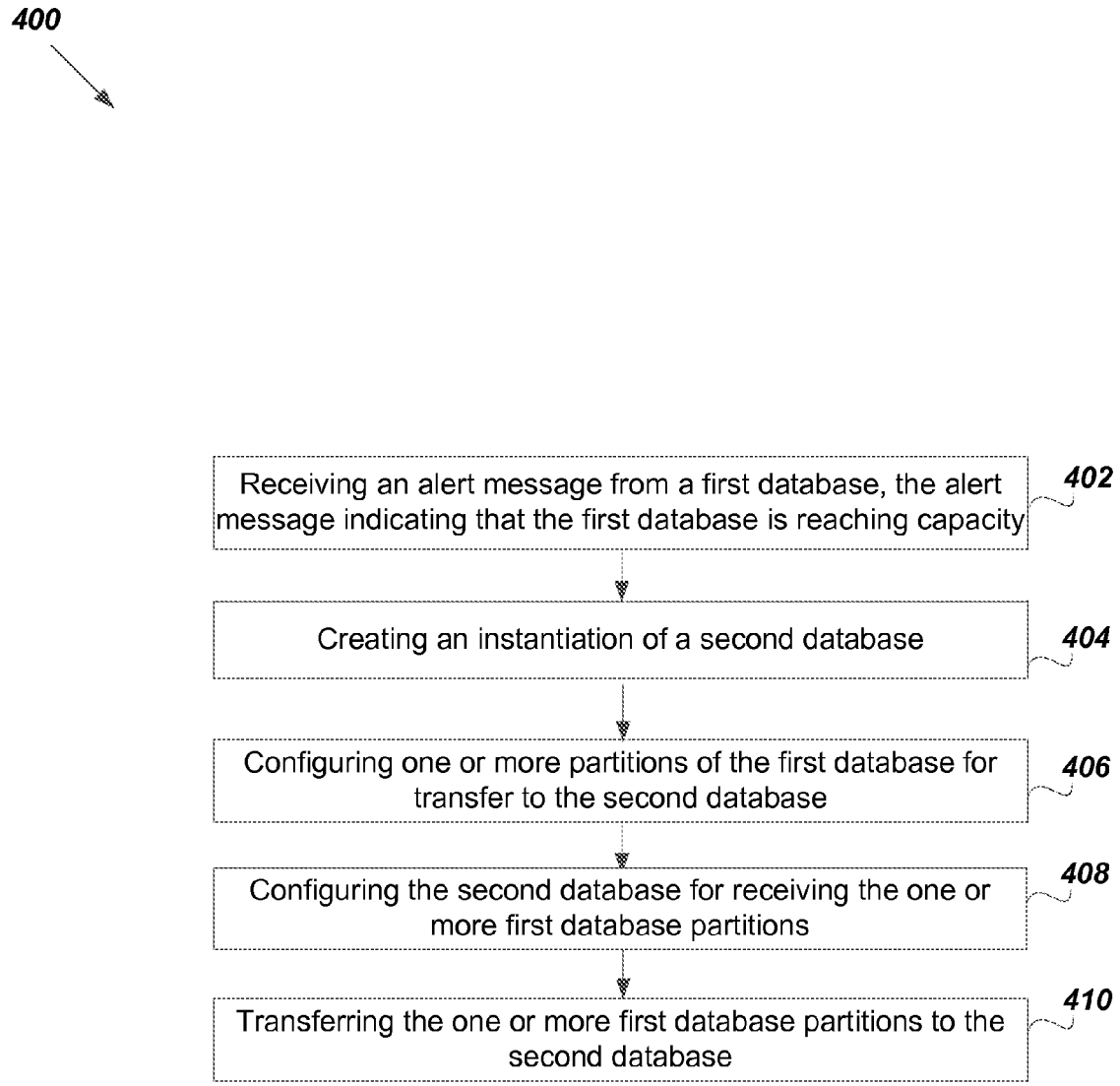
FIG. 4 is flow diagram illustrating a method for providing database scale-out according to an embodiment of the disclosure.

FIG. 4 is a flowchart of a method 400 for providing database scale-out according to an embodiment of the disclosure. In some embodiments, the method 400 may be implemented via the system components and/or applications described above with respect to FIGS. 1-3F. The method 400 may generally include receiving 402 an alert message from a first database, the alert message indicating that the first database is reaching capacity. The method 400 may also include creating 404 an instantiation of a second database. The method 400 may include configuring 406 one or more partitions of the first database for transfer to the second database, and configuring 408 the second database for receiving the one or more first database partitions. For instance, a first data sub-range may be created at a source database, and a range of a destination database may be extended to at least the range of a first data sub-range. The extension may be referred to as a second data sub-range. To prevent changes to the data during transfer the transferred data, the second data sub-range may be designated as changing, and the second data sub-range may be created at a database location adjacent to the first data sub-range. The method 400 may then include transferring 410 the one or more first database partitions to the second database. For instance, the data associated with the key values representing first data sub-range start and end points may be transferred to the second database and the mode of the second data sub-range may be changed to read-only. Upon transfer of the data, the first data sub-range mode may be changed to deleted and the second data sub-range on the second database may be removed. Removing the second sub-range may result in the data mode of contained data changing to read-write. The first data sub-range on the first database may be cleared. The clearing may cause the first database data range change to contract to exclude the first data sub-range. The data associated with the key values representing first data sub-range start and end points may be deleted at the first database.

Figure 5:
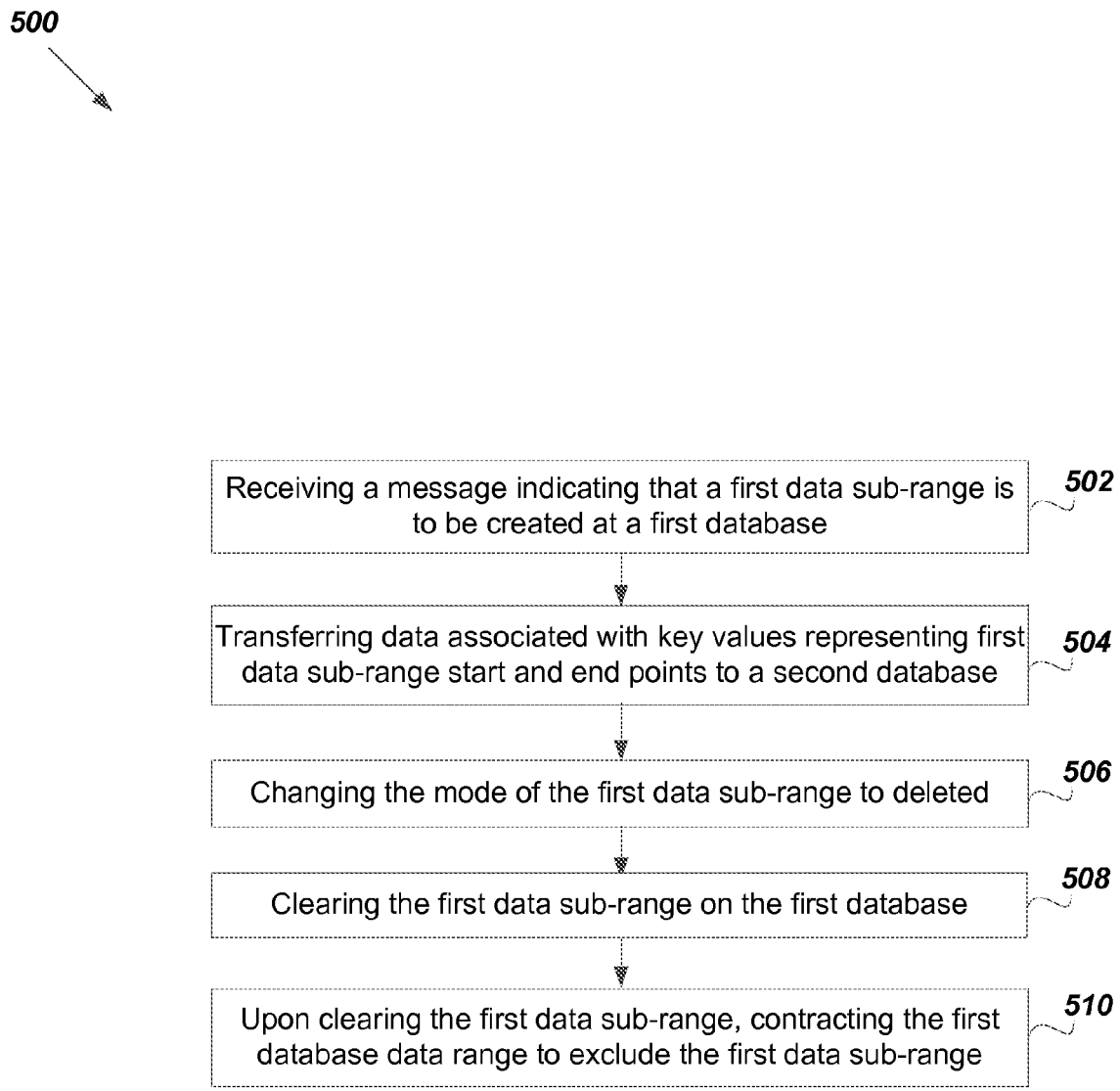
FIG. 5 is flow diagram illustrating a method for providing database scale-out according to an embodiment of the disclosure.

FIG. 5 is a flowchart of a method 500 for providing database scale-out according to an embodiment of the disclosure. In some embodiments, the method 500 may be implemented via the system components and/or applications described above with respect to FIGS. 1-3F. The method 500 may generally include receiving 502 a message indicating that a first data sub-range is to be created at a first database. The first data sub-range may have a read only mode. The method 500 may also include transferring 504 data associated with key values representing first data sub-range start and end points to a second database. The method 500 may further include changing 506 the mode of the first data sub-range to deleted. The method 500 may also include clearing 508 the first data sub-range on the first database. Upon clearing the first data sub-range, the method 500 may include contracting 510 the first database data range to exclude the first data sub-range.

Figure 6:
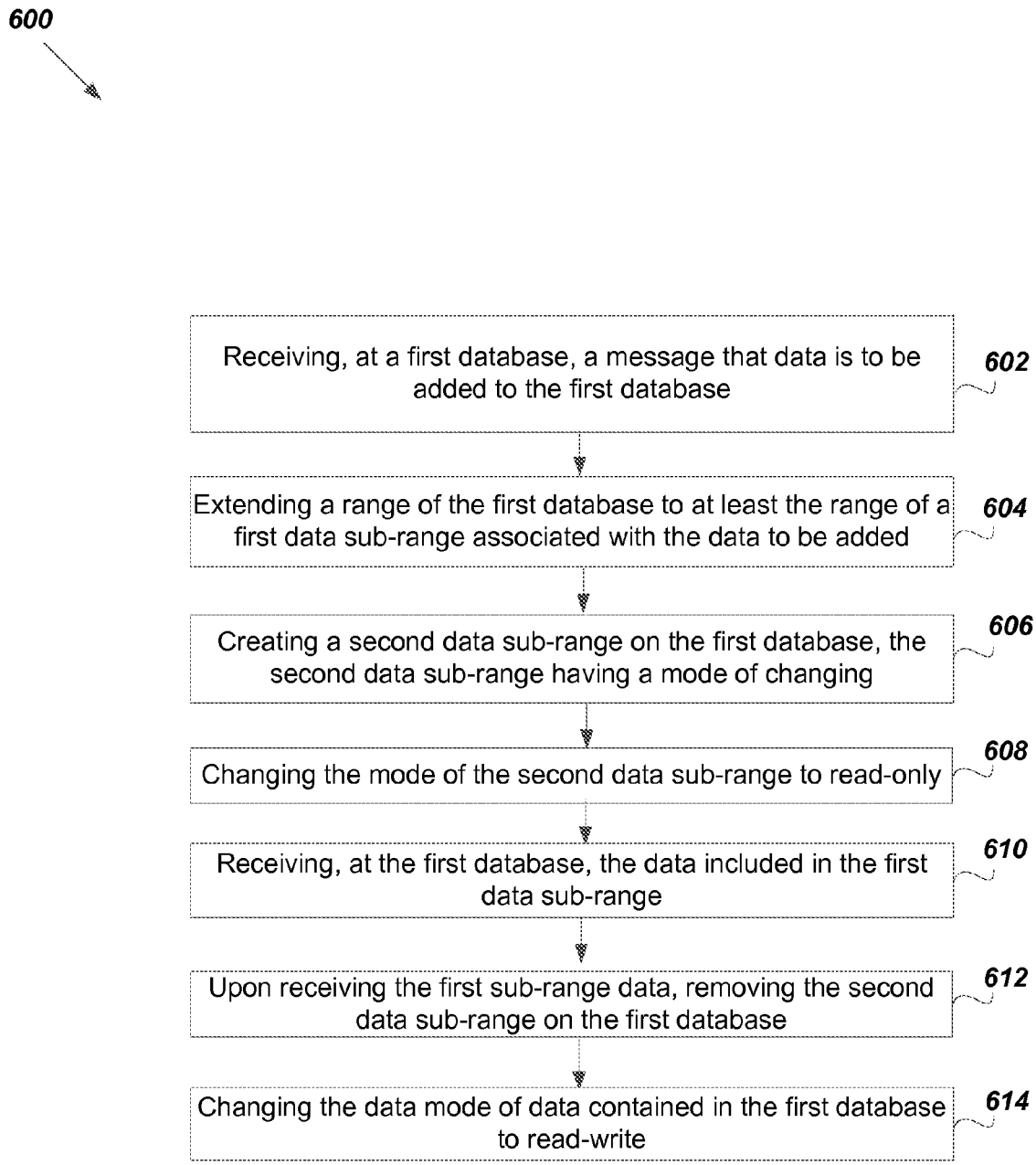
FIG. 6 is flow diagram illustrating a method for providing database scale-out according to an embodiment of the disclosure.

FIG. 6 is a flowchart of a method 600 for providing database scale-out according to an embodiment of the disclosure. In some embodiments, the method 600 may be implemented via the system components and/or applications described above with respect to FIGS. 1-3F. The method 600 may generally include receiving 602, at a first database, a message that data is to be added to the database. The data to be added may be a first sub-range of data stored in a second database. The method 600 may further include extending 604 a range of the first database to at least the range of the data sub-range. The method 600 may also include creating 606 a second data sub-range on the first database. The second data sub-range may be designated as changing, and the second data sub-range may be created at a first database location adjacent to the first data sub-range of the second database. The method 600 may further include changing 608 the mode of the second data sub-range to read-only. The method 600 may include receiving 610 the data included in the first data sub-range. Upon receiving the first sub-range data, the method 600 may include removing 612 the second data sub-range on the first database. The method 600 may also include changing 614 the data mode of data contained in the first database to read-write.

Embodiments above the above described system and method may be implemented as a computer process, a computing system or as an article of manufacture such as a computer program product or computer readable media. The computer program product may be a computer storage media or device readable by a computer system and encoding a computer program of instructions for executing a computer process.

The example systems and methods in FIGS. 1-6 have been described with specific client devices, applications, modules, and interactions that may execute in conjunction with an application program that runs on an operating system on a personal computer. Embodiments are not limited to systems according to these example configurations. Furthermore, specific protocols and/or interfaces may be implemented in a similar manner using the principles described herein.

Figure 7:
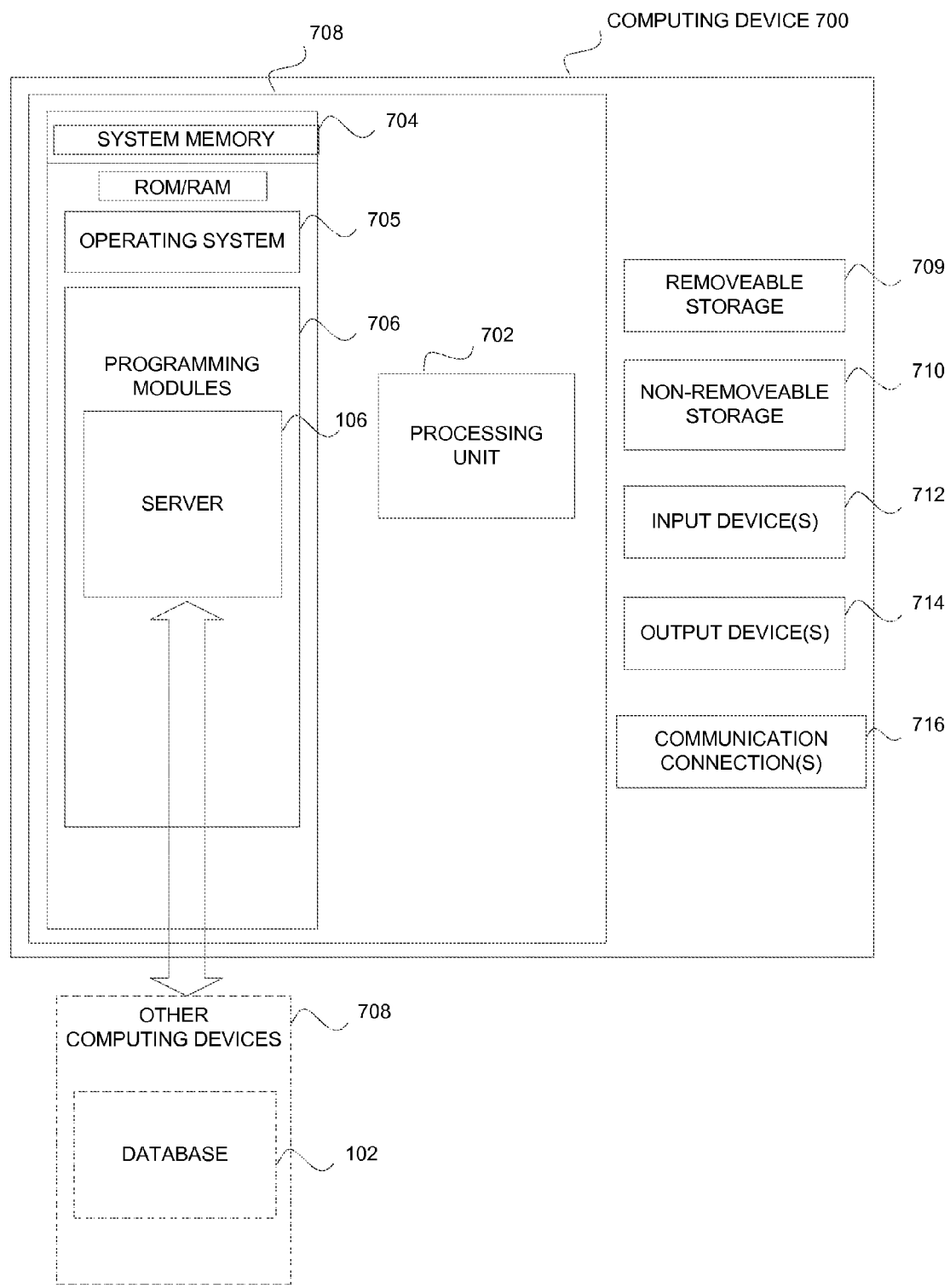
FIG. 7 is a simplified block diagram of a computing system in which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 7 and its associated description provide a discussion of a variety of operating environments in which embodiments may be practiced. However, the devices and systems illustrated and discussed with respect to FIG. 7 are for purposes of example and illustration and are not limiting of a vast number of computing device configurations that may be utilized for practicing embodiments, described herein.

FIG. 7 is a block diagram illustrating example physical components of a computing device 700 with which embodiments may be practiced. In a basic configuration, computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705 and one or more programming modules 706. Operating system 705, for example, may be suitable for controlling the operation of computing device 700. Furthermore, embodiments may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710.

As stated above, a number of program modules and data files may be stored in system memory 704, including operating system 705. While executing on processing unit 702, programming modules 706 may perform processes including, for example, one or more of the processes described above with reference to FIGS. 1-6. The aforementioned processes are an example, and processing unit 702 may perform other processes. Other programming modules that may be used in accordance with embodiments may include browsers, database applications, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device/system 700 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or tangible computer-readable storage medium. The computer program product may be a computer-readable storage medium readable by a computer system and tangibly encoding a computer program of instructions for executing a computer process. The term computer-readable storage medium as used herein may include computer storage media. Computer storage media may include volatile and nonvolatile, removable and non-removable media implemented in any method or technology for storage of information, such as computer-readable instructions, data structures, program modules, or other data. System memory 704, removable storage 709, and non-removable storage 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a keyboard, a mouse, a pen, a sound input device, a touch input device, etc. Output device(s) such as a display, speakers, a printer, etc. may also be included. The aforementioned devices are examples and others may be used.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Embodiments herein may be used in connection with mobile computing devices alone or in combination with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-6. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

It will be apparent to those skilled in the art that various modifications or variations may be made to embodiments without departing from the scope or spirit. Other embodiments are apparent to those skilled in the art from consideration of the specification and practice of the embodiments disclosed herein.

What is claimed:

1. A method for scaling out database information stored on a first database comprising a first data range, the method comprising:
    creating, by a computing device, an instantiation of a second database;
    configuring one or more partitions of the first database for transfer to the second database;
    configuring the second database for receiving the one or more first database partitions, wherein configuring the second database comprises:
        creating a second data range on the second database at a location substantially adjacent to the first data range; and
        designating the second data range as changing;
    transferring the one or more first database partitions to the second database; and
    deleting data on the first database associated with the transferred one or more first database partitions without deleting the transferred one or more first database partitions from the second database.

2. The method of claim 1, wherein configuring one or more partitions of the first database includes identifying a first data sub-range for the first database, the first data sub-range including the one or more first database partitions.

3. The method of claim 2, further including designating the first data sub-range as read only.

4. The method of claim 3, wherein configuring the second database includes extending a range of the second database to at least the range of the first data sub-range.

5. The method of claim 2, wherein transferring the one or more first database partitions includes transferring, to the second database, data associated with key values representing a start point and an end point of the first data sub-range.

6. The method of claim 5, further including, upon transferring the key values, changing the mode of the second data sub-range to read-only and changing the mode of the first data sub-range to deleted.

7. The method of claim 6, further including, upon changing the mode of the first data sub-range, removing the second data sub-range on the second database, wherein removing the second sub-range changes the data mode of contained data to read-write.

8. The method of claim 7, further including clearing the first data sub-range on the source database, wherein the clearing causes the source database data range to contract to exclude the first data sub-range.

9. The method of claim 1, further including receiving an alert message from the first database, the alert message indicating that the first database is reaching capacity.

10. A system for performing providing database scale-out for a first database comprising a first data range, the system comprising:
    at least one processor; and
    memory coupled to the at least one processor, the memory comprising computer executable instructions that, when executed by the at least one processor, performs a method comprising:
        creating an instantiation of a second database, the second database instantiation based in part on the first database reaching capacity;
        configuring one or more partitions of the first database for transfer to the second database;
        configuring the second database for receiving the one or more first database partitions, wherein configuring the second database comprises:
            creating a second data range on the second database at a location substantially adjacent to the first data range; and
            designating the second data range as changing;
        transferring the one or more first database partitions to the second database; and
        deleting data on the first database associated with the transferred one or more first database partitions without deleting the transferred one or more first database partitions from the second database.

11. The system of claim 10, wherein configuring one or more partitions of the first database includes identifying a first data sub-range for the first database, the first data sub-range including the one or more first database partitions.

12. The system of claim 11, further comprising designating the first data sub-range as read only.

13. The system of claim 11, wherein transferring the one or more first database partitions includes transferring, to the second database, data associated with key values representing a start point and an end point of the first data sub-range.

14. The system of claim 13, further comprising, upon transferring data associated with the key values, changing the mode of the second data sub-range to read-only and changing the mode of the first data sub-range to deleted.

15. The system of claim 14, further comprising, upon changing the mode of the first data sub-range, removing the second data sub-range on the second database, wherein removing the second sub-range changes the data mode of contained data to read-write.

16. The system of claim 14, further comprising, clearing the first data sub-range on the source database, wherein the clearing causes the source database data range to contract to exclude the first data sub-range.

17. The system of claim 10, wherein configuring the second database includes extending a range of the second database to at least the range of the first data sub-range.

18. The system of claim 10, further comprising receiving an alert message from a first database, the alert message indicating that the first database is reaching capacity.

19. The system of claim 10, wherein creating the second data range includes initiating the creation of a log entry comprising action attributes associated with the database scale-out.

20. A computer-readable medium comprising executable instructions that, when executed by a processor, provide database scale-out, the computer-readable medium including instructions executable by the processor for:

receiving an alert message from a first database, the alert message indicating that the first database is reaching capacity;

creating a first data sub-range for the first database, the first data sub-range having a read only mode;

extending a range of a second database to at least the range of the first data sub-range;

creating a second data sub-range on the second database, the second data sub-range having a changing mode, the second data sub-range created at a database location adjacent to the first data sub-range;

transferring data associated with key values representing a start point and an end point of the first data sub-range start and end points to the second database;

changing the mode of the second data sub-range to read-only;

changing the mode of the first data sub-range to deleted;

removing the second data sub-range on the second database, wherein removing the second sub-range changes the data mode of contained data to read-write;

deleting the data on the first database associated with the key values; and clearing the first data sub-range on the source database, wherein the clearing causes the source database data range to contract to exclude the first data sub-range.

\* \* \* \* \*